Nov. 5, 1940.   C. G. WOOD   2,220,565
CLUTCH
Original Filed March 17, 1938

INVENTOR.
CLARENCE G. WOOD
BY Fay, Colrick, Williams & Fay
ATTORNEYS.

Patented Nov. 5, 1940

2,220,565

UNITED STATES PATENT OFFICE 2,220,565

CLUTCH

Clarence G. Wood, Cleveland, Ohio, assignor to Monmouth Products Company, Cleveland, Ohio, a corporation of Ohio Original application March 17, 1938, Serial No. 196,378. Divided and this application April 29, 1940, Serial No. 332,261

1 Claim. (Cl. 192—68)

This invention relates to a friction clutch, and more particularly to one adapted for automotive use. Clutches for this service which must convey the rotative force of the motor to the rear axle assembly necessarily encounter considerable shock at the instant of engagement. If this shock is of a magnitude occasioned by instantaneous gripping of the clutch surfaces considerable strain is placed on the mechanical parts and the surfaces themselves wear very rapidly.

The chief object of my invention has been to provide a clutch wherein a lost-motion connection is provided, which becomes active at the instant of engagement of the clutch surface to permit a slight lag before the axle load is picked up by the motor. Such a lag need exist only for a very short period of time which in practice is equivalent to a very small rotative component.

An additional object of the invention has been to provide a linkage connecting two portions of the clutch together to cause the rotation as a unit and which linkage is resiliently positioned to maintain such rotation and yet be susceptible to the lost motion above set out.

Additional objects of the invention will become apparent from the following specification and appended drawing, while the novel features will be summarized in the claim.

In said annexed drawing—

Figure 1:
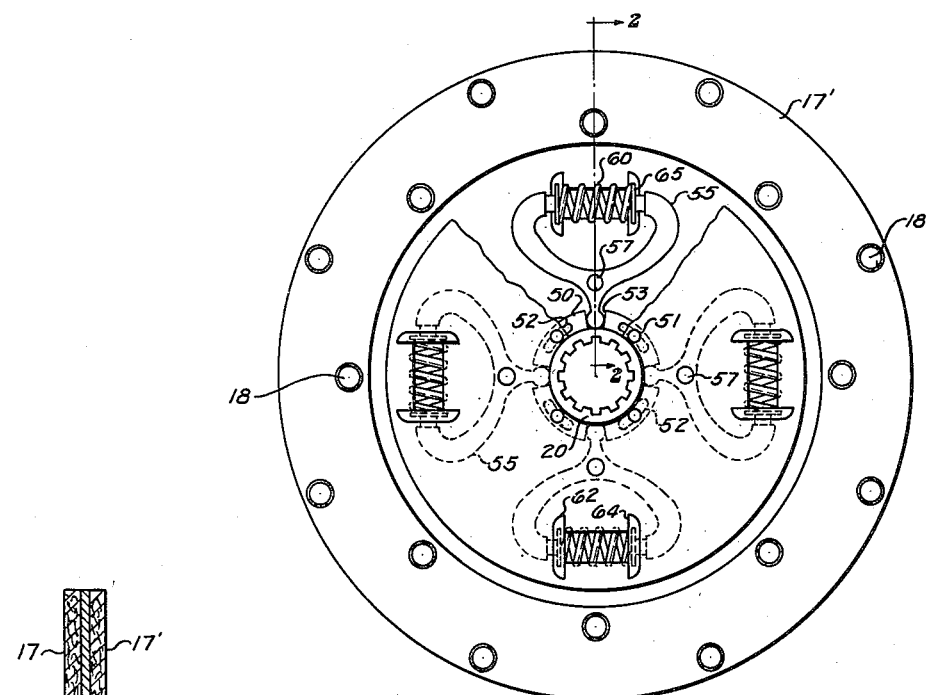
Fig. 1 is a plan view of a clutch plate embodying my invention.
Figure 2:
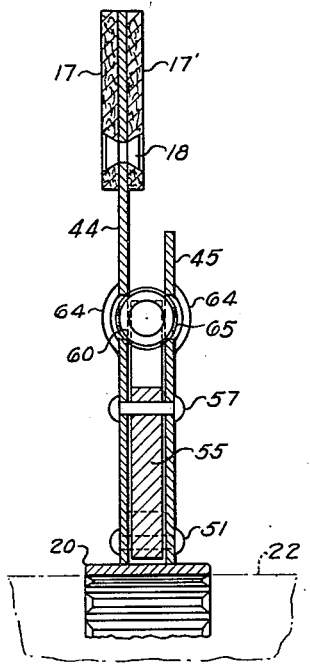
Fig. 2 is a section through the clutch plate, taken on the line indicated by the arrows 2—2 of Fig. 1.

Referring to the drawing, I provide a flat plate 44, to the outer periphery of which is secured the annular clutch facings 17 and 17' by suitable rivets 18. A splined hub 20, slidably mounted on the driven shaft 22, is provided and is resiliently connected to the plate 44 as hereinafter described.

The main clutch plate 44 is supplemented by a plate 45 spaced axially therefrom. The plates 44 and 45 are mounted on the hub 20 as follows.

The hub 20 includes an outwardly projecting spider 50. The plates 44 and 45 are riveted together by rivets 51 which pass through annularly extending slots 52 in the spider 50 to retain the plates and spider together against axial movement while permitting slight rotative movement therebetween. The spider 50 is provided with four slots 53 equally spaced thereabout.

Fork members 55, carried between plates 44 and 45, and pivoted thereto, as at 57, are positioned with the stem portion of the forks within the respective slots 53 of the spider 50. The forks are rotatable clockwise or counter-clockwise about their pivots to permit absorption of shock transmitted between the clutch surface and the hub.

The pivotal movement of the forks is limited by strong compression springs 60 carried by the plates 44 and 45 and bearing at their ends against thrust members 65 which, in turn, are disposed within cup-like seats 62 and 64, which are formed by bending the metal of the plates 44 and 45 outwardly at circumferentially spaced points. The thrust members 65 bear against the arms of the forks 55. As the fork 55 is rocked in a clockwise direction, for instance, as viewed in Fig. 1, the right-hand end of the spring 60 is prevented from movement to the right by engagement between the thrust member 65 and the right-hand ends of the seats 62 and 64. Thus, the spring tends to oppose the fork 55 as shown. If the fork 55 tends to shift in a counter-clockwise direction, the left-hand end of the spring 60 will be similarly prevented from movement and the spring will act to oppose the said fork.

From the description above given it will be apparent that the plate assembly 44—45 and the hub 20 can shift annularly relatively to each other, but will be repositioned due to the influence of the springs 60. In this manner, the shock of engagement of the clutch is absorbed by the mechanism just described.

From the foregoing description it will be apparent that I have provided an improved clutch plate construction in which simple link members or fingers, under the influence of springs, permit and yet limit relative rotative motion between the clutch plate facing and the splined hub connection to the driven shaft.

This application is a division of my copending application, Serial No. 196,378, filed March 17, 1938.

Other modes of applying the principle of my invention may be employed instead of the one explained, change being made as regards the structure herein disclosed, provided the means stated by the following claim or the equivalent of such stated means be employed.

I therefore particularly point out and distinctly claim as my invention:

A clutch construction comprising a central hub, a clutch plate carried thereby and rotatable with respect thereto, a series of radial shoulders on said hub coacting to provide a series of annularly spaced recesses, forked members pivotally carried by said plate and with their stem portions lying in said recesses, spring members carried by said plate between the arms of said forks respectively and positioned to resiliently act against said arms to yieldingly restrain said hub and said plate from rotative movement relative to each other.

CLARENCE G. WOOD.